(12) United States Patent
Morioka et al.

(10) Patent No.: US 7,018,738 B2
(45) Date of Patent: Mar. 28, 2006

(54) ELECTRODE AND BATTERY USING SAME

(75) Inventors: Yukiko Morioka, Tokyo (JP); Masaharu Satoh, Tokyo (JP); Shigeyuki Iwasa, Tokyo (JP); Jiro Iriyama, Tokyo (JP); Kentaro Nakahara, Tokyo (JP); Masahiro Suguro, Tokyo (JP)

(73) Assignee: NEC Corporation, Tokyo (JP)

( * ) Notice: Subject to any disclaimer, the term of this patent is extended or adjusted under 35 U.S.C. 154(b) by 246 days.

(21) Appl. No.: 10/262,438

(22) Filed: Oct. 1, 2002

(65) Prior Publication Data

US 2003/0082447 A1 May 1, 2003

(30) Foreign Application Priority Data

Oct. 3, 2001 (JP) .............................. 2001-307457

(51) Int. Cl.
*H01M 4/60* (2006.01)
*C08G 73/06* (2006.01)
*C01D 241/52* (2006.01)

(52) U.S. Cl. ........................ 429/213; 544/338; 528/423
(58) Field of Classification Search ................ 429/212, 429/213, 214, 215, 216, 217; 544/337, 339, 544/342, 343, 344, 349, 338; 528/423
See application file for complete search history.

(56) References Cited

U.S. PATENT DOCUMENTS

| | | | |
|---|---|---|---|
| 3,553,208 A * | 1/1971 | Abushanab | 544/344 X |
| 3,567,728 A * | 3/1971 | Johnston et al. | 544/343 |
| 3,594,381 A * | 7/1971 | Seng et al. | 544/343 |
| 3,594,382 A * | 7/1971 | Seng et al. | 544/343 X |
| 3,900,473 A * | 8/1975 | Diel et al. | 544/344 X |
| 4,442,187 A | 4/1984 | MacDiarmid et al. | 429/213 |
| 4,833,048 A | 5/1989 | Dejonghe et al. | 429/104 |
| 2004/0202930 A1 * | 10/2004 | Armand et al. | 429/213 |

FOREIGN PATENT DOCUMENTS

| | | | |
|---|---|---|---|
| JP | 05-074459 | | 3/1993 |
| JP | 9-3171 | * | 1/1997 |
| JP | 2003-178751 | * | 6/2003 |

* cited by examiner

*Primary Examiner*—Stephen J. Kalafut
(74) *Attorney, Agent, or Firm*—Hayes Soloway P.C.

(57) ABSTRACT

An electrode including a compound acting as an electrode active material and represented by a general formula (1) having a diazine N,N'-dioxide structure. A novel battery with the higher specific density and the excellent charge and discharge stability can be provided by incorporating the electrode having the compound represented by the general formula (1).

[General Formula 1]

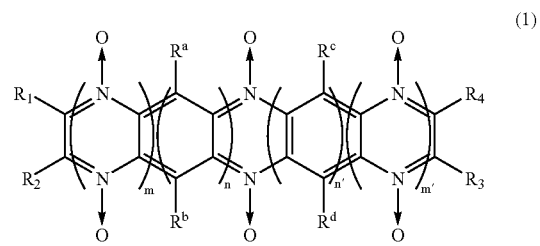

(1)

20 Claims, 1 Drawing Sheet

FIG. 1

ELECTRODE AND BATTERY USING SAME

BACKGROUND OF THE INVENTION (a) Field of the Invention

The present invention relates to an electrode and a battery using the electrode, and more specifically to the electrode containing, as an electrode active material, a compound having a diazine N,N'-dioxide structure, and the battery using the compound for achieving a higher specific density and an excellent charge and discharge stability.

(b) Description of the Related Art

A battery is a device which can take out chemical energy as electric energy utilizing oxidation-reduction reactions occurring on a positive electrode and a negative electrode or can store electric energy as chemical energy, and is utilized as a power source in various equipment.

Recently, with the spread of mobile electronic equipment, there have been increased needs for a lightweight battery with a large capacity. To satisfy the needs, a battery has been developed which utilizes alkali-metal ions whose mass per unit electric charge is low. Among others, a lithium-ion battery is particularly utilized for various mobile equipments for its superiority in stability and large capacity. The lithium-ion battery uses a heavy-metal oxide containing lithium as an active material in the positive electrode and a carbon electrode as an active material in the negative electrode respectively and charge and discharge are performed utilizing a reaction of lithium-ion insertion in and elimination from these electrodes.

However, since the lithium-ion battery utilizes a heavy-metal compound with large specific gravity particularly as an active material in the positive electrode, it has not a sufficient capacity per unit mass of the battery and there has been a problem that it cannot act as a battery having a high energy density.

Therefore, developments of a battery having a large capacity utilizing electrode materials having less weight have been tried. For example, U.S. Pat. No. 4,833,048 and Japanese Patent 2,715,778 have disclosed a battery using an organic compound having a disulfide bond as an active material in a positive electrode, which utilizes an electrochemical oxidation-reduction reaction based on formation and dissociation of the disulfide bond.

Since the battery utilizes organic compounds comprising elements having a smaller mass such as sulfur and carbon as electrode materials, these materials are effective to some degree in providing a battery with high energy density, however, there have been problems that the efficiency of rebinding of the dissociated disulfide bond is low and the stability of charge and discharge was not sufficient.

There has been suggested a battery utilizing an organic compound, as an active material, i.e., a battery utilizing an conductive polymer as an electrode material. This battery performs charge and discharge by doping and undoping reactions of electrolyte ions for the conductive polymer. The doping reaction as described herein is defined as a reaction of stabilizing excitons such as charged solitons and polarons generated by the electrochemical redox reaction of the conductive polymer by counter ions. On the other hand, the undoping reaction as described herein is defined as a reverse reaction of the doping reaction, that is, the reaction of oxidizing or reducing electrochemically the excitons stabilized by the counter ions.

U.S. Pat. No. 4,442,187 has disclosed a battery using the conductive polymer as a positive electrode material or a negative electrode material. Since the conductive polymer of the battery is composed of elements having a lower mass such as carbon and nitrogen, the development of a battery having a large capacity and a high energy density has been expected.

The conductive polymer, however, has a property in general that excitons generated by electrochemical redox reaction are delocalized over a wide region of $\pi$-electron conjugated system and interact with each other, which causes a problem of limiting the concentration of excitons generated, and therefore, imposing restriction on the capacity of the battery.

Therefore, the battery which utilizes this kind of conductive polymer as an electrode material has been still insufficient from a view point of producing a battery having a large capacity although it has been effective in producing a lightweight battery.

As described above, it is impossible in principle to produce a battery having an energy density higher than is existing ones by a lithium-ion battery utilizing a heavy metal oxide as an active material of positive electrode. There have been various proposals for a battery which utilizes a light mass compound as an active material of electrode in place of a heavy metal oxide having heavy mass, however, a battery having a high energy density with excellent stability has not been obtained yet.

SUMMARY OF THE INVENTION

It is therefore an object of the present invention to provide a battery having the higher specific density and excellent charge and discharge stability, and an electrode suitable for forming the battery.

The inventors have found that a specified organic compound which, though being formed by lower mass atoms, has not been used as the active material of the electrode, that is, a specified compound having a diazine N,N'-dioxide structure can be used as the active material.

Thus, the present invention provides an electrode including a compound acting as an electrode active material and represented by a general formula (1) having a diazine N,N'-dioxide structure ("n", "m", "n'" and "m'" independently designate an integer not less than zero; condensation order of a diazine ring and a benzene ring may be alternate or random; substituents $R_1$, $R_2$, $R_3$, $R_4$, $R^a$, $R^b$, $R^c$ and $R^d$ independently designate hydrogen atom, halogen atom, hydroxyl group, nitro group, nitroso group, cyano group, carboxyl group, substituted or non-substituted alkyl group, substituted or non-substituted alkenyl group, substituted or non-substituted cycloalkyl group, substituted or non-substituted aromatic hydrocarbon group, substituted or non-substituted aromatic heterocyclic group, substituted or non-substituted aralkyl group, substituted or non-substituted amino group, substituted or non-substituted alkoxy group, substituted or non-substituted aryloxy group, substituted or non-substituted aryloxycarbonyl group or substituted or non-substituted acyl group; when "n" is 2 or more, $R^a$ and $R^b$ may be the same as or different from each other; when "n'" is 2 or more, $R^c$ and $R^d$ may be the same as or different from each other; one or more atoms of these substituents may be replaced with sulfur atom, silicon atom, phosphorous atom or boron atom; and a ring may be formed using the substituents).

[General Formula 1]

In accordance with the present invention, a novel battery with the higher specific density and the excellent stability at charge and discharge can be provided by incorporating therein the compound having the general formula (1).

The above and other objects, features and advantages of the present invention will be more apparent from the following description.

PREFERRED EMBODIMENTS OF THE INVENTION

Figure 1:
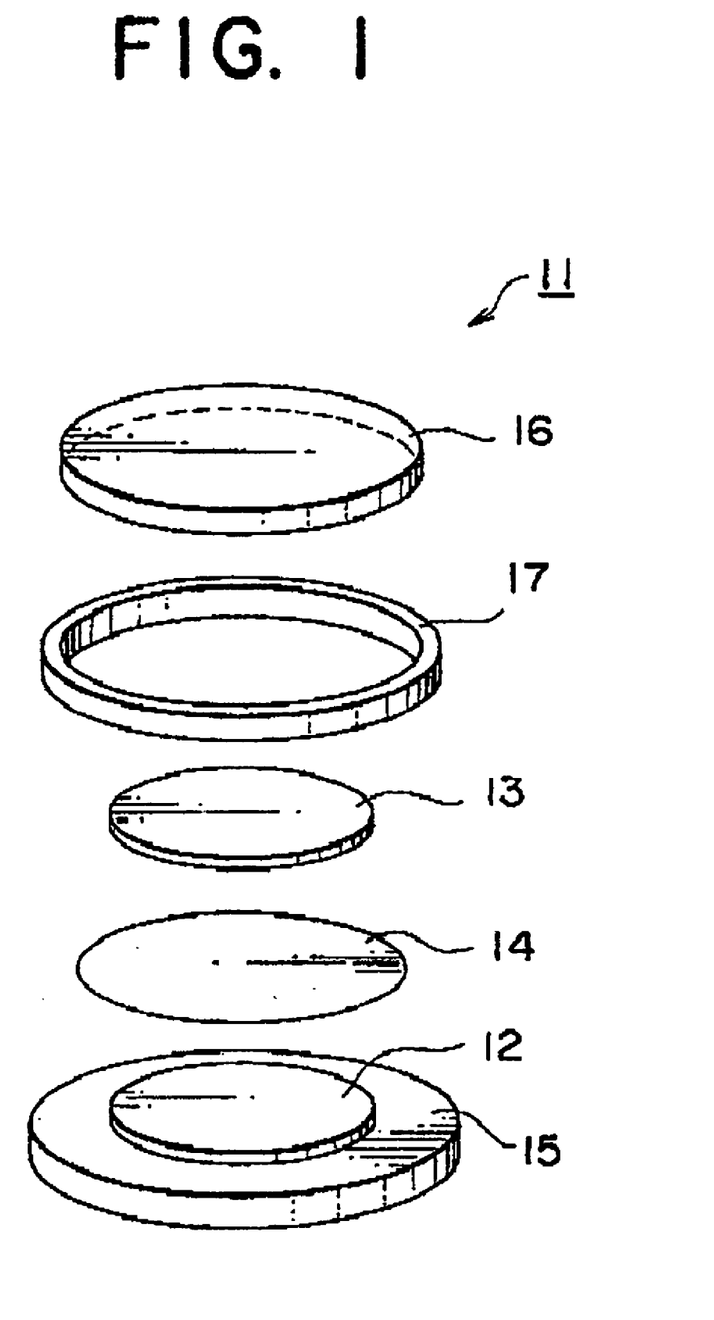
FIG. 1 is a broken perspective view showing a battery in accordance with an embodiment of the present invention.

Now, the present invention is more specifically described referring to the annexed drawing.

As shown in FIG. 1, a battery 11 has a stacked structure including a cathode 12 and an anode 13 facing to each other and sandwiching a separator 14 containing electrolyte. The cathode 12 and the anode 13 are mounted on a cathode current collector 15 and an anode current collector 16, respectively. Between the two current collectors 15, 16, a frame-like insulation packing 17 is located for preventing the electrical contact therebetween. The insulation packing 17 made of plastic resin surrounds the both electrodes 12, 13 and the separator 14. Solid electrolyte or gel electrolyte may be present, in place of the separator, between the electrodes.

In the present embodiment, the active material of the cathode 12 and/or the anode 13 contain the compound having the diazine N,N'-dioxide structure represented by the general formula [1]. The compound may be replaced with an oligomer or polymer compound whose part of structure unit or whole structure unit is comprised of bivalent diazine N,N'-dioxide group in which two substituents selected from $R_1$, $R_2$, $R_3$, $R_4$, $R^a$, $R^b$, $R^c$ and $R^d$ are replaced with bivalent groups having two bonding electrons. Hereinafter, the compound and the oligomer or polymer compound may be referred to as "diazine N,N'-dioxide compound".

In view of the specific capacity, the battery of the present invention is preferably a lithium rechargeable battery containing the diazine N,N'-dioxide compound and a lithium ion as the cathode active material and an electrolyte cation, respectively.

Then, each of the components of the present invention will be illustrated.

[1] Active Material

The electrode active material of the present invention refers to materials directly contributing to electrode reactions such as charge and discharge and playing the major role of a battery system.

[1-1] Diazine N,N'-Dioxide Compound

The diazine N,N'-dioxide compound which is the essential active material includes a diazine compound ("n+m+n'+m'=0" is satisfied in the general formula (1)), a polyacene compound ("n+m+n'+m'≧1" is satisfied in the general formula (1)) and an oligomer or polymer compound having bivalent group structural units bonded to the condensed rings of the polyacene compound ("n+m+n'+m'≧2" is satisfied in the general formula (1)). The diazine N,N'-dioxide compound may include one of these compounds or two or more compounds in combination.

The halogen atom of the substituents $R_1$, $R_2$, $R_3$, $R_4$, $R^a$, $R^b$, $R^c$ and $R^d$ in the general formula [1] includes fluorine, chlorine, bromine and iodine. One of these atoms or two or more atoms in combination can be used.

Examples of the substituted or non-substituted alkyl group include methyl group, ethyl group, propyl group, isopropyl group, n-butyl group, s-butyl group, isobutyl group, t-butyl group, n-pentyl group, n-hexyl group, n-heptyl group, n-octyl group, hydroxymethyl group, 1-hydroxyethyl group, 2-hydroxyethyl group, 2-hydroxyisobutyl group, 1,2-dihydroxyethyl group, 1,3-hydroxyisopropyl group, 2,3-dihydroxy-t-butyl group, 1,2,3-trihydroxypropyl group, chloromethyl group, 1-chloroethyl group, 2-chloroethyl group, 2-chloroisobutyl group, 1,2-chloroethyl group, 1,3-dichloroisopropyl group, 2,3-dichloro-t-butyl group, 1,2,3-trichloropropyl group, bromomethyl group, 1-bromoethyl group, 2-bromoethyl group, 2-bromoisobutyl group, 1,2-dibromoethyl group, 1,3-dibromoisopropyl group, 2,3-dibromo-t-butyl group, 1,2,3-tribromopropyl group, iodomethyl group, 1-iodoethyl group, 2-iodoethyl group, 2-iodoisobutyl group, 1,2-diiodoethyl group, 1,3-diiodoisopropyl group, 2,3-diiodo-t-butyl group, 1,2,3-triiodopropyl group, aminomethyl group, 1-aminoethyl group, 2-aminoethyl group, 2-aminoisobutyl group, 1,2diaminoethyl group, 1,3-diaminoisopropyl group, 2,3-diamino-t-butyl group, 1,2,3-triaminopropyl group, cyanomethyl group, 1-cyanoethyl group, 2-cyanoethyl group, 2-cyanoisobutyl group, 1,2-dicyanoethyl group, 1,3-dicyanoisopropyl group, 2,3-dicyano-t-butyl group, 1,2,3-tricyanopropyl group, nitromethyl group, 1-nitroethyl group, 2-nitroethyl group, 2-nitroisobutyl group, 1,2-dinitroethyl group, 1,3-dinitroisopropyl group, 2,3-dinitro-t-butyl group, and 1,2,3-trinitropropyl group. The above compound may include one of these groups or two or more groups in combination.

Examples of the substituted or non-substituted alkenyl group include vinyl group, allyl group, 1-butenyl group, 2-butenyl group, 3-butenyl group, 1,3-butanedienyl group, 1-methylvinyl group, styryl group, 2,2-diphenylvinyl group, 1,2-diphenylvinyl group, 1-methylallyl group, 1,1-dimethylallyl group, 2-methylallyl group, 1-phenylallyl group, 2-phenylallyl group, 3-phenylallyl group, 3,3-diphenylallyl group, 1,2-dimethylallyl group, 1-phenyl-1-butenyl group and 3-phenyl-1-butenyl group. The above compound may include one of these groups or two or more groups in combination.

Examples of the substituted or non-substituted cycloalkyl group include cyclopropyl group, cyclobutyl group, cyclopentyl group, cyclohexyl group and 4-methylcyclohexyl group. The above compound may include one of these groups or two or more groups in combination.

Examples of the substituted or non-substituted aromatic hydrocarbon group include phenyl group, 1-naphthyl group, 2-naphthyl group, 9-fluorenyl group, 1-anthryl group, 2-anthryl group, 9-anthryl group, 1-phenanthryl group, 2-phenanthryl group, 3-phenanthryl group, 4-phenanthryl group, 9-phenanthryl group, 1-naphthacenyl group, 2-naphthacenyl group, 9-naphthacenyl group, 1-pyrenyl group, 2-pyrenyl group, 4-pyrenyl group, 2-biphenylyl group, 3-biphenylyl group, 4-biphenylyl group, p-terphenyl-4-yl group, p-terphenyl-3-yl group, p-terphenyl-2-yl group, m-terphenyl-4-yl group, m-terphenyl-3-yl group, m-terphenyl-2-yl group, o-tolyl group, m-tolyl group, p-tolyl group, p-t-butylphenyl group, p-(2-phenylpropyl)phenyl group, 3-methyl-2-naphthyl group, 4-methyl-1-naphthyl group, 4-methyl-1-anthryl group, 4'-methylbiphenylyl group, 4"-t-butyl-p-terphenyl-4-yl group, and the derivatives thereof. The above compound may include one of these groups or two or more groups in combination.

Examples of the substituted or non-substituted aromatic heterocyclic group include 1-pyrrolyl group, 2-pyrrolyl group, 3-pyrrolyl group, pyrazinyl group, 2-pyridinyl group, 3-pyridinyl group, 4-pyridinyl group, 1-indolyl group, 2-indolyl group, 3-indolyl group, 4-indolyl group, 5-indolyl group, 6-indolyl group, 7-indolyl group, 1-isoindolyl group, 2-isoindolyl group, 3-isoindolyl group, 4-isoindolyl group, 5-isoindolyl group, 6-isoindolyl group, 7-isoindolyl group, 2-furyl group, 3-furyl group, 2-benzofuranyl group, 3-benzofuranyl group, 4-benzofuranyl group, 5-benzofuranyl group, 6-benzofuranyl group, 7-benzofuranyl group, 1-isobenzofuranyl group, 3-isobenzofuranyl group, 4-isobenzofuranyl group, 5-isobenzofuranyl group, 6-isobenzofuranyl group, 7-isobenzofuranyl group, 2-quinolyl group, 3-quinolyl group, 4-quinolyl group, 5-quinolyl group, 6-quinolyl group, 7-quinolyl group, 8-quinolyl group, 1-isoquinolyl group, 3-isoquinolyl group, 4-isoquinolyl group, 5-isoquinolyl group, 6-isoquinolyl group, 7-isoquinolyl group, 8-isoquinolyl group, 2-quinoxalinyl group, 5-quinoxalinyl group, 6-quinoxalinyl group, 1-carbazolyl group, 2-carbazolyl group, 3-carbazolyl group, 4-carbazolyl, group, 9-carbazolyl group, 1-phenanthridinyl group, 2-phenanthridinyl group, 3-phenanthridinyl group, 4-phenanthridinyl group, 6-phenanthridinyl group, 7-phenanthridinyl group, 8-phenanthridinyl group, 9-phenanthridinyl group, 10-phenanthridinyl group, 1-acridinyl group, 2-acridinyl group, 3-acridinyl group, 4-acridinyl group, 9-acridinyl group, 1,7-phenanthroline-2-yl group, 1,7-phenanthroline-3-yl group, 1,7-phenanthroline-4-yl group, 1,7-phenanthroline-5-yl group, 1,7-phenanthroline-6-yl group, 1,7phenanthroline-8-yl group, 1,7-phenanthroline-9-yl group, 1,7-phenanthroline-10-yl group, 1,8-phenanthroline-2-yl group, 1,8-phenanthroline-3-yl group, 1,8-phenanthroline-4-yl group, 1,8-phenanthroline-5-yl group, 1,8-phenanthroline-6-yl group, 1,8-phenanthroline-7-yl group, 1,8-phenanthroline-9-yl group, 1,8-phenanthroline-10-yl group, 1,9-phenanthroline-2-yl group, 1,9-phenanthroline-3-yl group, 1,9-phenanthroline-4-yl group, 1,9-phenanthroline-5-yl group, 1,9-phenanthroline-6-yl group, 1,9-phenanthroline-7-yl group, 1,9-phenanthroline-8-yl group, 1,9-phenanthroline-10-yl group, 1,10-phenanthroline-2-yl group, 1,10-phenanthroline-3-yl group, 1,10-phenanthroline-4-yl group, 1,10-phenanthroline-5-yl group, 2,9-phenanthroline-1-yl group, 2,9-phenanthroline-3-yl group, 2,9-phenanthroline-4-yl group, 2,9-phenanthroline-5-yl group, 2,9-phenanthroline-6-yl group, 2,9-phenanthroline-7-yl group, 2,9-phenanthroline-8-yl group, 2,9-phenanthroline-10-yl group, 2,8-phenanthroline-1-yl group, 2,8-phenanthroline-3-yl group, 2,8-phenanthroline-4-yl group, 2,8-phenanthroline-5-yl group, 2,8-phenanthroline-6-yl group, 2,8-phenanthroline-7-yl group, 2,8-phenanthroline-9-yl group, 2,8-phenanthroline-10-yl group, 2,7-phenanthroline-1-yl group, 2,7-phenanthroline-3-yl group, 2,7-phenanthroline-4-yl group, 2,7-phenanthroline-5-yl group, 2,7-phenanthroline-6-yl group, 2,7-phenanthroline-8-yl group, 2,7-phenanthroline-9-yl group, 2,7-phenanthroline-10-yl group, 1-phenazinyl group, 2-phenazinyl group, 1-phenothiazinyl group, 2-phenothiazinyl group, 3-phenothiazinyl group, 4-phenothiazinyl group, 10-phenothiazinyl group, 1-phenoxazinyl group, 2-phenoxazinyl group, 3-phenoxazinyl group, 4-phenoxazinyl group, 10-phenoxazinyl group, 2-oxazolyl group, 4-oxazolyl group, 5-oxazolyl group, 2-oxadiazolyl group, 5-oxadiazolyl group, 3-furazanyl group, 2-thienyl group, 3-thienyl group, 2-methylpyrrole-1-yl group, 2-methylpyrrole-3-yl group, 2-methylpyrrole-4-yl group, 2-methylpyrrole-5-yl group, 3-methylpyrrole-1-yl group, 3-methylpyrrole-2-yl group, 3-methylpyrrole-4-yl group, 3-methylpyrrole-5-yl group, 2-t-butylpyrrole-4-yl group, 3-(2-phenylpropyl)pyrrole-1-yl group, 2-methyl-1-indolyl group, 4-methyl-1-indolyl group, 2-methyl-3-indolyl group, 4-methyl-3-indolyl group, 2-t-butyl-1-indolyl group, 4-t-butyl-1-indolyl group, 2-t-butyl-3-indolyl group, 4-t-butyl-3-indolyl group, and the derivatives thereof. The above compound may include one of these groups or two or more groups in combination.

Examples of the substituted or non-substituted aralkyl group include benzyl group, 1-phenylethyl group, 2-phenylethyl group, 1-phenylisopropyl group, 2-phenylisopropyl group, phenyl-t-butyl group, α-naphthylmethyl group, 1-α-naphthylethyl group, 2-α-naphthylethyl group, 1-α-naphthylisopropyl group, 2-α-naphthylisopropyl group, β-naphthylmethyl group, 1-β-naphthylethyl group, 2-β-naphthylethyl group, 1-β-naphthylisopropyl group, 2-β-naphthylisopropyl group, 1-pyrrolylmethyl group, 2-(1-pyrrolyl)ethyl group, p-methylbenzyl group, m-methylbenzyl group, o-methylbenzyl group, p-chlorobenzyl group, m-chlorobenzyl group, o-chlorobenzyl group, p-bromobenzyl group, m-bromobenzyl group, o-bromobenzyl group, p-iodobenzyl group, m-iodobenzyl group, o-iodobenzyl group, p-hydroxybenzyl group, m-hydroxybenzyl group, o-hydroxybenzyl group, p-aminobenzyl group, m-aminobenzyl group, o-aminobenzyl group, p-nitrobenzyl group, m-nitrobenzyl group, o-nitrobenzyl group, p-cyanobenzyl group, m-cyanobenzyl group, o-cyanobenzyl group, 1-hydroxy-2-phenylisopropyl group and 1-chloro-2-phenylisopropyl group, and the above compound may include one of these groups or two or more groups in combination.

The substituted or non-substituted amino group is expressed by $-NX_1X_2$, wherein each of given $X_1$ and $X_2$ independently represents hydrogen atom, the above-mentioned substituted or non-substituted alkyl group, the above-mentioned substituted or non-substituted alkenyl group, the above-mentioned substituted or non-substituted cycloalkyl group, the above-mentioned substituted or non-substituted aromatic hydrocarbon group, the above-mentioned substituted or non-substituted aromatic heterocyclic group, and the above-mentioned substituted or non-substituted aralkyl group. The above compound may include one of these groups or two or more groups in combination.

The substituted or non-substituted alkoxy group or the substituted or non-substituted alkoxycarbonyl group are represented by $-OX^3$ and $-COOX^4$, respectively.

Examples of the substituents $X^3$ and $X^4$ include the above-mentioned substituted or non-substituted alkyl groups, the substituted or non-substituted cycloalkyl groups and the substituted or non-substituted aralkyl groups. The above compound may include one of these groups or two or more groups in combination.

The substituted or non-substituted aryloxy group and the substituted or non-substituted aryloxycarbonyl group are represented by $-OX^5$ and $-COOX^6$, respectively. Examples of the substituents $X^5$ and $X^6$ include the above-mentioned substituted or non-substituted aromatic hydrocarbon groups and the substituted or non-substituted aromatic heterocyclic groups. The above compound may include one of these groups or two or more groups in combination.

The substituted or non-substituted acyl group is represented by —C(=O)X$^7$. Examples of the substituent X$^7$ include hydrogen atom, the above-mentioned substituted or non-substituted alkyl group, the substituted or non-substituted alkenyl group, the substituted or non-substituted cycloalkyl group, the substituted or non-substituted aromatic hydrocarbon group, the substituted or non-substituted aromatic heterocyclic group, and the substituted or non-substituted aralkyl group. The above compound may include one of these groups or two or more groups in combination.

Examples of bivalent groups having two bonding electrons for forming a ring include tetramethylene group, pentamethylene group, hexamethylene group, diphenylmetane-2,2'-diyl group, diphenyletane-3,3'-diyl group, diphenylpropane-4,4'-diyl group, 1,3-butadiene-1,4-diyl group and their derivatives.

One or more atoms in the above-mentioned substituents may be replaced with a sulfur atom, silicon atom, phosphorous atom or boron atom. The substituent replaced with the sulfur may be, for example, the above-mentioned oxygen-containing groups such as the hydroxyl group, the carboxyl group, the alkoxy group, the alkoxycarbonyl group, the aryloxy group, the aryloxycarbonyl group and the acyl group in which the oxygen atom is replaced with a sulfur atom. Examples of these substituents include mercapto group, dithiocarboxyl group, hydroxy(thiocarbonyl) group, mercaptocarbonyl group, methylthio group, methoxythiocarbonyl group, methylthiocarbonyl group, methyldithiocarbonyl group, phenylthio group, phenoxythiocarbonyl group, phenylthiocarbonyl group, phenyldithiocarbonyl group and methylthiocarbonyl group. The substituent replaced with the silicon atom may be, for example, the above-mentioned alkyl group, the alkenyl group, the cycloalkyl group and the aralkyl group in which the carbon atom is replaced with a silicon atom. Examples of these substituents include silyl group, methylsilyl group, silylmethyl group, ethylsilyl group, (methylsilyl)methyl group, dimethylsilyl group, trimethylsilyl group, t-butyldimethylsiyl group and triisopropylsilyl group. The substituent replaced with the phosphorous atom may be, for example, the above-mentioned amino groups in which the nitrogen atom is replaced with a phosphorous atom. Examples of these substituents include phosphino group, trimethylphosphino group and triphenylphosphino group. The substituent replaced with the boron atom may be, for example, the above-mentioned amino groups in which the nitrogen atom is replaced with a boron atom. Examples of these substituents include dimethylboryl group and dephenylboryl group.

The diazine N,N'-dioxide compound of the present invention acts as the electrode active material in the electrode and is contained as a starting material, a product or an intermediate product in the charge and discharge reactions. The diazine N,N'-dioxide ring allows the oxidation-reduction reaction on the electrode designated by the below reaction formula (A) in which only the diazine N,N'-dioxide ring is shown. Especially, the one-electron oxidation-reduction reaction between the compound (III) and the compound (IV), the one-electron oxidation-reduction reaction between the compound (III) and the compound (II), and the two-electron oxidation-reduction reaction between the compound (II) and the compound (IV) in the reaction formula (A) can be desirably used.

[Reaction Formula A]

The solubility of the diazine N,N'-dioxide compound into the electrolyte is desirably lower to prevent the decrease of the specific capacity thereof. Or desirably, the diazine N,N'-dioxide compound is hardly soluble or insoluble. The solubility of the above compound into the electrolyte is, for example, 1 g or less, preferably 0.5 g or less or more preferably 0.1 g or less into 100 g of the electrolyte such as propylene carbonate.

In view of the solubility into the electrolyte, 2-position and 3-position of the terminal diazine rings of the polyacene-type diazine N,N'-dioxide compound and of the oligomer or polymer-type diazine N,N'-dioxide compound preferably have the subsituents with lower polarity other than hydrogen atom. Such a substituent includes alkyl group such as methyl group, ethyl group, n-propyl group, isopropyl group, isobutyl group, n-butyl group, sec-butyl group and tert-butyl group.

In view of the solubility into the electrolyte and the specific density, the diazine N,N'-dioxide compound preferably has a condensed ring formed by three or more rings (that is, "n+m+n'+m'≧2" is satisfied in the general formula (1)). In view of mainly the solubility into the electrolyte, the condensed ring including one or more benzene rings (that is, "n+n'≧1" is satisfied in the general formula (1)) is preferable. In view of mainly the specific density, the condensed ring including two or more diazine N,N'-dioxide rings (that is, "m+m'≧1" is satisfied in the general formula (1)) is preferable.

Further, in view of the solubility into the electrolyte and the specific density, the diazine N,N'-dioxide compound is preferably the oligomer or polymer compound having the bivalent group having two bonding electrons on the condensed ring of the polyacene compound (n+m+n'+m'≧2) of the general formula (1).

In view of the solubility into the electrolyte, the molecular weight of the diazine N,N'-dioxide compound is preferably higher. However, in view of the solubility into the reaction solvent, $n+m+n'+m'\leq 20$ is preferable for the polyacene compound, and $n+m+n'+m'\leq 10$ is more preferable. For the oligomer or polymer compound, the weight-average molecular weight determined by gel permeation chromatography (GPC, standard sample: polystyrene) is preferably 200,000 or less, and more preferably 100,000 or less.

The diazine N,N'-dioxide compound of the present invention can be synthesized by using the known process such as oxidation of the corresponding diazine compound with peroxide or peracid. The synthesis of the diazine N,N'-dioxide compound using urea peroxide is described in Synlett., p 533–535, September 1990. The compound represented by the below general formula (4) can be synthesized by adding dichloromethane solution of m-chloroperbenzoic acid into dichloromethane solution of phenazine, agitating the mixed solution at room temperature and neutralizing the solution by addition of saturated solution of sodium carbonate followed by purification in an ordinary method.

The oligomer or polymer-type compound of the diazine N,N'-dioxide compound can be synthesized in accordance with the following method. The oligomer or polymer compound having the bivalent group with the two bonding electrons on the condensed rings having a diazine ring (pyrazine ring) is reacted with peroxide to convert the nitrogen atom in the condensed ring to the N-oxide (first method). In another method, a dihalide compound having two halogens as substituents of the condensed ring of the polyacene-type diazine N,N'-dioxide compound is dehalogenated by adding a nickel compound having zero valency thereto in an organic solvent (second method).

In the first method against polyacene compound, the higher condensation degree also lowers the solubility into a reaction solvent other than the solvent for the electrolyte such that the diazine ring may be difficult to be oxidized and the purification may be hardly conducted. The remaining of the unoxidized diazine ring and the impurities invites the decrease of the specific capacity. Accordingly, the number of the condensed rings is preferably in the above range. Similarly, in the first method against oligomer or polymer compound, the oxidation of the diazine ring and the purification are made to be difficult to decrease the specific capacity when the molecular weight is too high. Accordingly, the molecular weight is preferably in the above range.

Examples of the diazine N,N'-dioxide compounds of the present invention include the below compounds, represented by the general formulae (2) to (17).
(General Formula 2)
(General Formula 3)
(General Formula 4)
(General Formula 5)
(General Formula 6)
(General Formula 7)
(General Formula 8)
(General Formula 9)
(General Formula 10)
(General Formula 11)
(General Formula 12)
(General Formula 13)
(General Formula 14)
(General Formula 15)
(General Formula 16)
(General Formula 17)

(2)

(3)

(4)

(5)

(6)

(7)

(8)

[1-2] Other Active Substances

The battery of the present invention is characterized by the excellent specific density because the diazine N,N'-dioxide compound has the lower mass density than metal oxide-based active materials. The dioxide compound is preferably used as the cathode active material. When the dioxide material is used in one of the electrodes, the active material used in the other electrode may be any conventional material listed below.

Metal oxide particles, disulfide compounds and conductive polymers can be used as the cathode active material when the diazine N,N'-dioxide compound is used as the anode active material. Examples of the metal oxide include lithium manganate or lithium manganate having the spinel structure such as $LiMnO_2$ and $Li_xMn_2O_4$ ($0<x<2$); $MnO_2$, $LiCoO_2$, $LiNiO_2$ and $Li_xV_2O_5$ ($0<x<2$). Examples of the disulfide compounds include dithioglycol, 2,5-dimercapto-1,3,4-thiadiazole and S-triazine-2,4,6-trithiol. Examples of the conductive polymers include polyacetylene, polyphenylene, polyaniline and polypyrrole. These cathode active materials may be used as a single material or two or more materials in combination. These conventional active materials may be mixed with the diazine N,N'-dioxide compound to prepare a composite active material.

When, on the other hand, the diazine N,N'-dioxide compound is used as the cathode active material, the anode active material such as graphite, amorphous carbon, lithium metal, lithium alloy, lithium ion absorbing carbon and conductive polymer can be used. These anode active materials may be used as a single material or two or more materials in combination.

The shape of the active material is not especially restricted. A bulk, solidified powders, fibers and a flake can be used in addition to a film in case of the lithium metal and the lithium alloy.

[2] Auxiliary Conductive Material and Auxiliary Ionic Conductive Material

In order to decrease the impedance, an auxiliary conductive material and/or an auxiliary ionic conductive material may be mixed into the diazine N,N'-dioxide compound to form the electrode. The auxiliary conductive material includes carbon particles such as graphite, carbon black and acetylene black; and conductive polymers such as polyaniline, polypyrrole, polythiophene, polyacetylene and polyacene. The auxiliary ionic conductive material includes gel electrolyte and solid electrolyte.

[3] Binder

For increasing the bonding strength among the materials of the electrode, a binder may be mixed therein in the present invention. Examples of the binder include resin binders such as polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene and polyimide.

[4] Catalyst

For more smoothly performing the electrode reaction, catalyst for accelerating the oxidation-reduction reaction may be mixed in the electrode materials. Such a catalyst includes conductive polymers such as polyaniline, polypyrrole, polythiophene, polyacetylene and polyacene; basic compounds such as pyridine derivatives, pyrrolidone derivatives, benzimidazole derivatives, benzothiazole derivatives and acridine derivatives; and metal ion complexes.

[5] Current Collector and Separator

In the present invention, a metal foil or a metal plate made of nickel, aluminum, copper, gold, silver, aluminum alloy and stainless steal, a meshed electrode and a carbon electrode may be used as the cathode or anode current collector. The current collector having the catalysis or having the active material chemically-bonded thereto may be also used. For preventing the electrical contact between the current collectors, an insulation packing made of plastic resin may be located between them.

The material of the separator may be a porous film or a non-woven fabric.

[6] Electrolyte

The electrolyte has a role of transporting charged carriers between the electrodes. The electrolyte desirably has ionic conductivity from $10^{-5}$ to $10^{-1}$ S/cm. The electrolyte can be prepared by dissolving an electrolytic salt into a solvent.

Such an electrolytic salt includes known materials such as $LiPF_6$, $LiClO_4$, $LiBF_4$, $LiCF_3SO_3$, $Li(CF_3SO_2)_2N$, $Li(C_2F_5SO_2)_2N$, $Li(CF_3SO_2)_3C$ and $Li(C_2F_5SO_2)_3C$.

The solvent for the electrolyte may be an organic solvent such as ethylene carbonate, propylene carbonate, dimethylcarbonate, diethylcarbonate, methylethyl-carbonate, γ-butyrolactone, tetrahydrofuran, dioxolane, sulpholane, dimethylformamide, dimethylacetamide and N-methyl-2-pyrrolidone. In the present invention, one of these solvents may be used, or two or more solvents may be used as a mixed solvent.

In the present invention, polymer electrolyte may be also used such as a polymer compound impregnated with electrolyte and a polymer compound itself used as solid electrolyte.

Such a polymer compound includes a vinylidene fluoride-based polymer compound such as polyvinylidene fluoride, vinylidene fluoride-ethylene copolymer, vinylidene fluoride-monofluoroethylene copolymer, vinylidene fluoride-trifluoroethylene copolymer, vinylidene fluoride-tetrafluoroethylene copolymer, vinylidene fluoride-hexafluoropropylene copolymer and vinylidene fluoride-hexafluoropropylene-tetrafluoroethylene ternary copolymer; an acrylonitrile-based polymer compound such as acrylonitrile-methyl methacrylate copolymer, acrylonitrile-ethyl methacrylate copolymer, acrylonitrile-methyl acrylate copolymer, acrylonitrile-ethyl acrylate copolymer, acrylonitrile-methacrylic acid copolymer, acrylonitrile-acrylic acid copolymer and acrylonitrile-vinyl acetate copolymer; polyethylene oxide, ethylene oxide-propylene oxide copolymner, and their acrylate esters and methacrylate esters. One of these compounds may be individually used, or a mixture of two or more compounds may be used.

An inorganic solid electrolyte such as $CaF_2$, $AgI$, $LiF$, β-alumina and glass materials may also be used in the present invention.

In view of the required higher ionic conductivity, the battery electrolyte of the present invention is preferably the electrolytic solution or the gel electrolyte, especially the electrolytic solution, when the diazine N,N'-dioxide compound having the lower solubility into the electrolytic solution is used. On the other hand, the solid electrolyte which hardly dissolves the diazine N,N'-dioxide compound into the electrolyte may be used when the compound with the relatively higher solubility is used.

[7] Shape and Appearance of Battery

The shape and appearance of the battery of the invention are not especially restricted, and the known shape and appearance can be adopted. Such a shape includes a stacked or wound electrode which is sealed in a metal casing, a resin casing or by a laminated film made of a metal foil such as aluminum and a synthesized resin film. The battery appearance may be cylindrical, square, coin-shaped and sheet-shaped.

[8] Stacked Conformation of Electrode

The stacked conformations of the electrodes are not especially restricted in the invention. Any known conformation may be used such that the electrodes are stacked to form multi-layers, the electrodes are stacked on both surfaces of the current collector, and these stacks are further wound.

[9] Fabrication of Electrode and Battery

The fabrications of the electrode and the battery are not especially restricted in the invention. Any known method can be used.

The electrode may be fabricated by applying, on the current collector, slurry prepared by adding a solvent to the electrode materials followed by drying, or by hardening under pressure a mixture obtained by adding binder resin to the electrode materials, or by hardening the electrode materials under heat.

The battery may be fabricated by stacking the fabricated electrode with the counter electrode sandwiching the separator followed by winding, if necessary, wrapping the stack with an external package, and injecting the electrolytic solution for sealing.

At the fabrication of the battery, the above diazine N,N'-dioxide compound can be used as it is, or the compounds convertible thereto during the electrode reaction such as the compound (I), (II), (IV) or (V) shown in the Reaction Formula (A) may be used.

Although Examples of batteries in accordance with the present invention will be described, the present invention shall not be deemed to be restricted thereto.

EXAMPLE 1

25 mg of the diazine N,N'-dioxide compound represented by the general formula (5), 200 mg of graphite powder and 25 mg of a polytetrafluoroethylene resin binder were weighed and mixed in an agate mortar. This mixture after about 10 minutes' dry mixing was rolled under pressure to provide a thin electrode plate having a thickness of 215 µm. After overnight drying at 80° C. under a reduced pressure, the electrode plate was punched out to form a circular electrode mold having a diameter of 12 mm.

Then, the electrode mold was dipped in electrolytic solution, which was prepared by mixing ethylene carbonate and diethylcarnate (volume ratio; 3:7) with 1 mol/liter of $LiPF_6$ acting as the electrolytic salt, thereby impregnating the electrolytic solution into the pores of the electrode mold. The electrode mold acting as a cathode was mounted on a cathode current collector made of aluminum foil, and a porous film separator impregnated with the above electrolytic solution was mounted on the cathode. After a lithium metal plate acting as an anode was stacked thereon followed by the mounting of a frame-like insulation packing, an anode current collector made of copper foil was superposed. A pressure was applied on the obtained stack by using a caulking machine to provide a sealed coin-shaped battery.

The charging of the thus fabricated battery was conducted at fixed current of 0.1 mA. After increase of the voltage up to 4.5 V, the battery was discharged at the current of 0.1 mA. As a result, the battery was confirmed to properly operate because a voltage flattened section was observed around 4.0 V. The specific capacity per active material was calculated to be 140 mAh/g.

Further, the voltage change of the battery accompanied with the repeated charges and discharges was measured. Even after 10 cycles of the charges and discharges, the voltage flattened section was also observed around 4.0 V, and the battery was confirmed to operate as a rechargeable battery.

Comparative Example 1

A battery was fabricated in accordance with the procedures of Example 1 except that 25 mg of graphite was used in place of the diazine N,N'-dioxide compound of Example 1.

Then, the thus fabricated battery was discharged. The resulting rapid voltage decrease disabled the sufficient battery operation.

The charging of the battery was attempted by flowing fixed current of 0.1 mA, and the voltage increased to momentarily exceed 4.5 V. During the re-charging, no voltage flattened section could be observed on a voltage curve, thereby confirming that the battery could not operate as a rechargeable battery.

Comparative Example 2

A battery was fabricated in accordance with the procedures of Example 1 except that 25 mg of $LiCoO_2$ was used in place of the diazine N,N'-dioxide compound of Example 1.

After the charging and discharging of the thus-fabricated battery in accordance with the procedures of Example 1, the specific capacity per unit active material was calculated to be 96 mAh/g.

EXAMPLE 2

A battery was fabricated in accordance with the procedures of Example 1 except that the diazine N,N'-dioxide compound represented by the general formula [4] was used in place of that represented by the general formula [5].

Then, the thus fabricated battery was charged and discharged similarly to Example 1. As a result, the battery was confirmed to properly operate because a voltage flattened section was observed around 3.8 V.

Further, the voltage change of the battery accompanied with the repeated charges and discharges was measured similarly to Example 1. Even after 10 cycles of the charges and discharges, the battery was confirmed to operate as a rechargeable battery. The specific capacity per unit active material was calculated to be 100 mAh/g.

EXAMPLES 3 and 4

Batteries were fabricated in accordance with the procedures of Example 1 except that the diazine N,N'-dioxide compound represented by the general formula [8] (Example 3) and the polymer-type diazine N,N'-dioxide compound (weight average molecular weight: 50,000) represented by the general formula [11] (Example 4) were used in place of that represented by the general formula [5].

Then, the thus fabricated batteries were charged and discharged similarly to Example 1. As a result, the batteries were confirmed to properly operate because voltage flattened sections were observed in the both batteries.

Further, the voltage changes of the batteries accompanied with the repeated charges and discharges were measured similarly to Example 1. Even after 10 cycles of the charges and discharges, the batteries of the Examples 3 and 4 were confirmed to operate as rechargeable batteries.

Since the above embodiments are described only for examples, the present invention is not limited to the above embodiments and various modifications or alterations can be easily made therefrom by those skilled in the art without departing from the scope of the present invention.

What is claimed is:

1. A battery containing an electrode comprising a compound acting as an electrode active material and represented by a general formula (1) having a diazine N,N'-dioxide structure ("n", "m", "n'" and "m'" independently designate an integer not less than zero, and $n+m+n'+m'\geq 2$); condensation order of diazine rings and benzene rings may be alternate or random; substituents $R_1$, $R_2$, $R_3$, $R_4$, $R^a$, $R^b$, $R^c$ and $R^d$ independently designate a hydrogen atom, a halogen atom, a hydroxyl group, a nitro group, a nitroso group, a cyano group, a carboxyl group, a substituted or non-substituted alkyl group, a substituted or non-substituted alkenyl group, a substituted or non-substituted cycloalkyl group, a substituted or non-substituted aromatic hydrocarbon group, a substituted or non-substituted aromatic heterocyclic group, a substituted or non-substituted aralkyl group, a substituted or non-substituted amino group, a substituted or non-substituted alkoxy group, a substituted or non-substituted aryloxy group, a substituted or non-substituted aryloxycarbonyl group or a substituted or non-substituted acyl group; when "n" is 2 or more, $R^a$ and $R^b$ may be the same as or different from each other; when "n'" is 2 or more, $R^c$ and $R^d$ may be the same as or different from each other; one or more atoms of these substituents may be replaced with sulfur atom, a silicon atom, a phosphorous atom or a boron atom; and a ring may be formed using the substituents

17

[General Formula 1]

2. A battery containing an electrode comprising an oligomer or polymer compound acting as an electrode active material and represented by a general formula (1) having a diazine N,N'-dioxide structure ("n", "m", "n'" and "m'" independently designate an integer not less than zero, and n+m+n'+m'≧2); condensation order of diazine rings and benzene rings may be alternate or random; whose part of structure unit or whole structure unit is comprised of bivalent diazine N,N'-dioxide group in which two substituents selected from $R_1$, $R_2$, $R_3$, $R_4$, $R^a$, $R^b$, $R^c$ and $R^d$ are bivalent groups having two bonding electrons, and the remaining substituents $R_1$, $R_2$, $R_3$, $R_4$, $R^a$, $R^b$, $R^c$ and $R^d$ independently designate a hydrogen atom, a halogen atom, a hydroxyl group, a nitro group, a nitroso group, a cyano group, a carboxyl group, a substituted or non-substituted alkyl group, a substituted or non-substituted alkenyl group, a substituted or non-substituted cycloalkyl group, a substituted or non-substituted aromatic hydrocarbon group, a substituted or non-substituted aromatic heterocyclic group, a substituted or non-substituted aralkyl group, a substituted or non-substituted amino group, a substituted or non-substituted alkoxy group, a substituted or non-substituted aryloxy group, a substituted or non-substituted aryloxycarbonyl group or a substituted or non-substituted acyl group: when "n" is 2 or more, $R^a$ and $R^b$ may be the same as or different from each other; when "n'" is 2 or more. $R^c$ and $R^d$ may be the same as or different from each other; one or more atoms of these substituents may be replaced with a sulfur atom, a silicon atom, a phosphorous atom or a boron atom; and a ring may be formed using the substituents

[General Formula 1]

3. A battery as defined in claim 1, wherein the electrode is a cathode and/or an anode.

4. A battery as defined in claim 2, wherein the electrode is a cathode and/or an anode.

5. A battery as defined in claim 1, wherein the electrode is a cathode.

6. A battery as defined in claim 2, wherein the electrode is a cathode.

7. A battery as defined in claim 1, wherein the battery is a rechargeable battery.

8. A battery as defined in claim 2, wherein the battery is a rechargeable battery.

18

9. The battery as defined in claim 7, wherein the battery is a lithium rechargeable battery.

10. The battery as defined in claim 8, wherein the battery is a lithium rechargeable battery.

11. A battery containing an electrode comprising a compound acting as an electrode active material and represented by a general formula (1) having a diazine N,N'-dioxide structure ("n", "m", "n'" and "m'" independently designate an integer not less than zero); condensation order of diazine rings and benzene rings may be alternate or random; substituents $R_1$, $R_2$, $R_3$, $R_4$, $R^a$, $R^b$, $R^c$ and $R^d$ independently designate a hydroxyl group, a nitro group, a nitroso group, a cyano group, a carboxyl group, a substituted or non-substituted alkyl group, a substituted or non-substituted alkenyl group, a substituted or non-substituted cycloalkyl group, a substituted or non-substituted aromatic hydrocarbon group, a substituted or non-substituted aromatic heterocyclic group, a substituted or non-substituted aralkyl group, a substituted or non-substituted amino group, a substituted or non-substituted alkoxy group, a substituted or non-substituted aryloxy group, a substituted or non-substituted aryloxycarbonyl group or a substituted or non-substituted acyl group; when "n" is 2 or more, $R^a$ and $R^b$ may be the same as or different from each other; when "n'" is 2 or more, $R^c$ and $R^d$ may be the same as or different from each other; one or more atoms of these substituents may be replaced with a sulfur atom, silicon atom, phosphorous atom or boron atom; and a ring may be formed using the substituents

[General Formula 1]

12. A battery comprising an electrode comprising an oligomer or polymer compound acting as an electrode active material and represented by a general formula (1) having a diazine N,N'-dioxide structure ("n", "m", "n'" and "m'" independently designate an integer not less than zero); condensation order of diazine rings and benzene rings may be alternate or random; whose part of structure unit or whole structure unit is comprised of bivalent diazine N,N'-dioxide group in which two substituents selected from $R_1$, $R_2$, $R_3$, $R_4$, $R^a$, $R^b$, $R^c$ and $R^d$ are bivalent groups having two bonding electrons, and the remaining substituents are selected from substituents $R_1$, $R_2$, $R_3$, $R_4$, $R^a$, $R^b$, $R^c$ and $R^d$ independently designate a hydroxyl group, a nitro group, a nitroso group, a cyano group, a carboxyl group, a substituted or non-substituted alkyl group, a substituted or non-substituted alkenyl group, a substituted or non-substituted cycloalkyl group, a substituted or non-substituted aromatic hydrocarbon group, a substituted or non-substituted aromatic heterocyclic group, a substituted or non-substituted aralkyl group, a substituted or non-substituted amino group, a substituted or non-substituted alkoxy group, a substituted or non-substituted aryloxy group, a substituted or non-substituted aryloxycarbonyl group or a substituted or non-substituted acyl group: when "n" is 2 or more, $R^a$ and $R^b$ may be the same as or different from each other; when "n'" is 2 or more, $R^c$ and $R^d$ may be the same as or different from each other; one or more atoms of these substituents may be replaced with a sulfur atom, silicon atom, phosphorous atom or boron atom; and a ring may be formed using the substituents

[General Formula 1]

(1)

13. A battery as defined in claim 11, wherein the electrode is a cathode and/or an anode.

14. A battery as defined in claim 12, wherein the electrode is a cathode and/or an anode.

15. A battery as defined in claim 11, wherein the battery is a cathode.

16. A battery as defined in claim 12, wherein the battery is a cathode.

17. A battery as defined in claim 11, wherein the battery is rechargeable.

18. A battery as defined in claim 12, wherein the battery is rechargeable.

19. The battery as defined in claim 17, wherein the battery is a lithium rechargeable battery.

20. The battery as defined in claim 18, wherein the battery is a lithium rechargeable battery.

* * * * *

UNITED STATES PATENT AND TRADEMARK OFFICE
CERTIFICATE OF CORRECTION

PATENT NO. : 7,018,738 B2 Page 1 of 1
APPLICATION NO. : 10/262438
DATED : March 28, 2006
INVENTOR(S) : Morioka et al.

It is certified that error appears in the above-identified patent and that said Letters Patent is hereby corrected as shown below:

Claim 2, Column 17, Line 38, "." should be --,--.

Signed and Sealed this

Eleventh Day of July, 2006

JON W. DUDAS
*Director of the United States Patent and Trademark Office*